(12) United States Patent
Chou

(10) Patent No.: US 7,758,073 B1
(45) Date of Patent: Jul. 20, 2010

(54) LOCKABLE VEHICLE STEERING-WHEEL TILTING ASSEMBLY

(75) Inventor: Aidy H. C. Chou, City of Industry, CA (US)

(73) Assignee: Advance Tuner Warehouse Inc., City of Industry, CA (US)

( * ) Notice: Subject to any disclaimer, the term of this patent is extended or adjusted under 35 U.S.C. 154(b) by 231 days.

(21) Appl. No.: 12/151,237

(22) Filed: May 6, 2008

(51) Int. Cl.
B62D 1/18 (2006.01)
(52) U.S. Cl. ...................................... 280/775
(58) Field of Classification Search ............... 280/775, 280/779, 771; 74/529, 532, 534, 536, 552, 74/556
See application file for complete search history.

(56) References Cited
U.S. PATENT DOCUMENTS 1,457,722 A * 6/1923 Busby ................... 70/209
5,941,131 A 8/1999 Fohl
6,802,193 B1 10/2004 Long
7,441,479 B2 * 10/2008 Ichikawa ................ 74/556
2002/0124681 A1 9/2002 Hobaugh

* cited by examiner

*Primary Examiner*—Faye M. Fleming
(74) *Attorney, Agent, or Firm*—Albert O. Cota

(57) ABSTRACT

A lockable vehicle steering-wheel tilting assembly (LVWTA) (10) that functions in combination with and improves an existing vehicle steering-wheel tilting assembly. The LVWTA (10) includes an inward structure (12) that attaches to a steering-wheel column (102) and an outward structure (32) that is pivotally attached to the inward structure (12) and that it is attached to a vehicle-steering wheel (100). The LVWTA (10) is designed to position the steering wheel (100) in either a safe steering configuration or in a driver-exit configuration in which position the vehicle cannot be safely steered. The LVWTA (10) improves an existing steering wheel tilting assembly by removably inserting and attaching a locking insert (70) to the inward structure (12). When the locking insert (70) is attached and locked by means of a cylindrical key lock (90), the LVWTA (10) cannot be placed into the safe steering configuration.

15 Claims, 6 Drawing Sheets

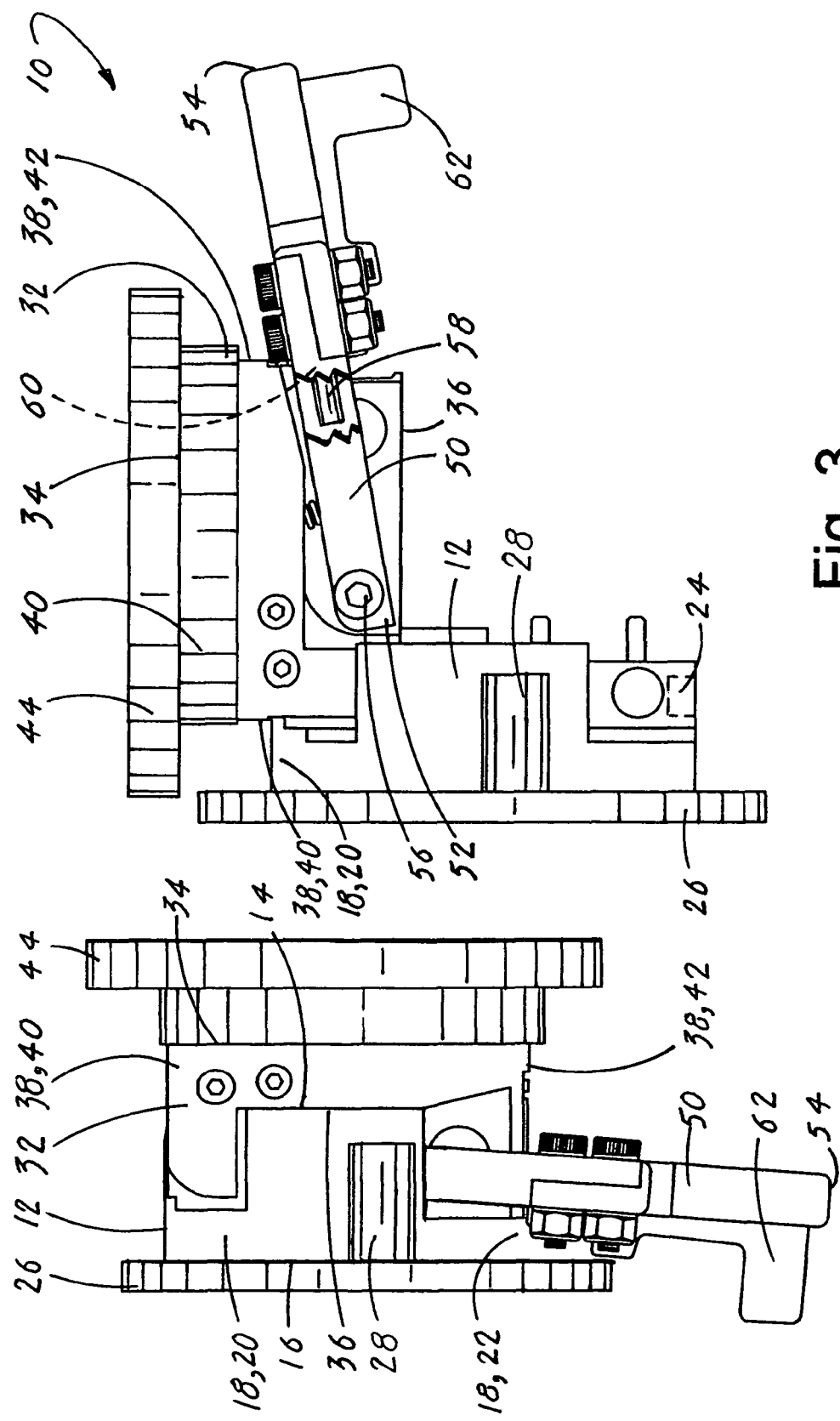

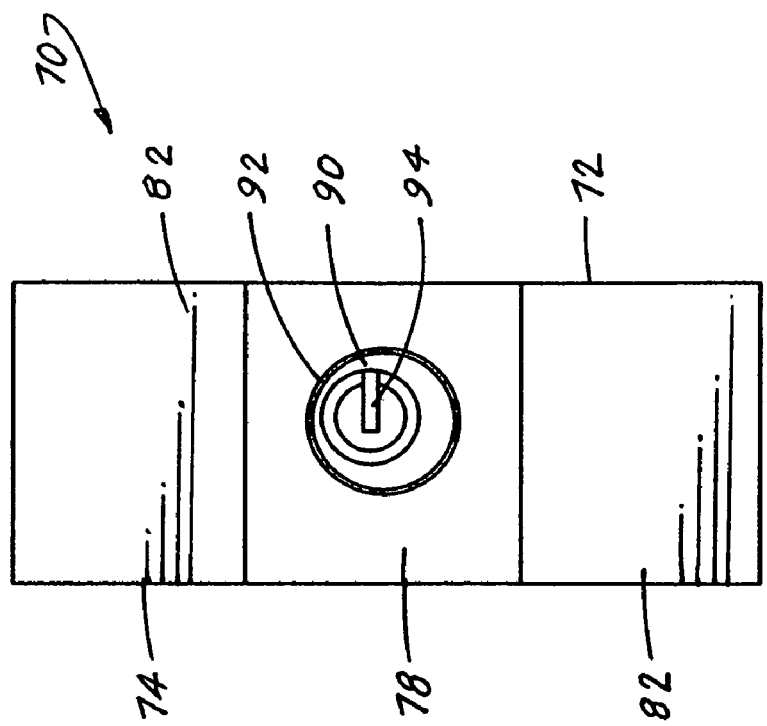
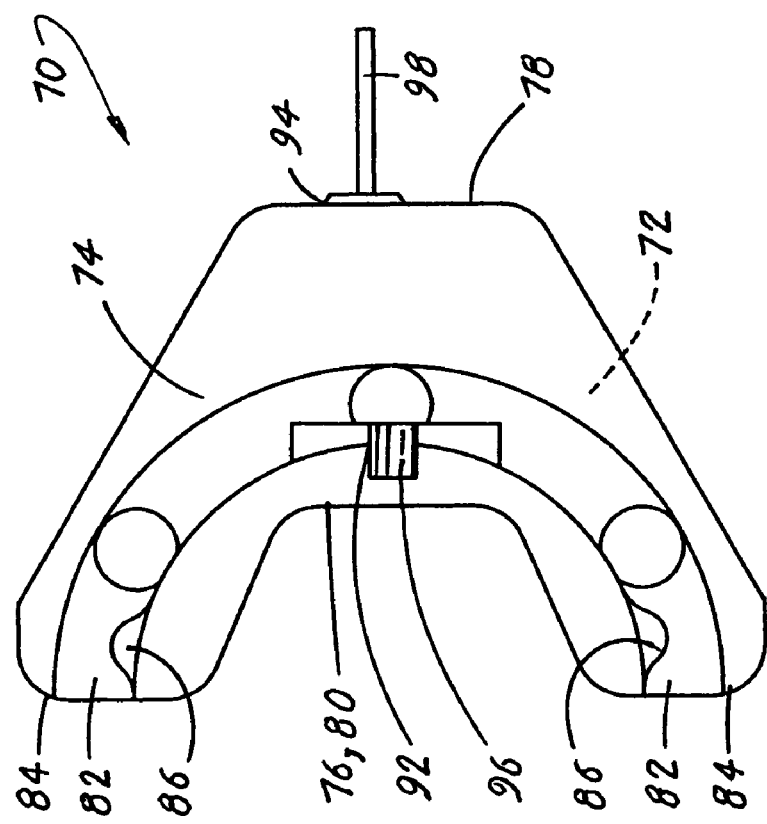
Fig. 9
Fig. 8

LOCKABLE VEHICLE STEERING-WHEEL TILTING ASSEMBLY

TECHNICAL FIELD

The invention generally pertains to vehicle steering-wheel tilting assemblies and more particularly to a vehicle steering-wheel tilting assembly that locks the steering wheel in a position that prevents the vehicle from being safely driven.

BACKGROUND ART

The use of a vehicle steering-wheel tilting assembly (VWTA) is well known in the prior art. In most vehicles the tilt angle of the steering wheel is selectively set by the vehicle driver by manually positioning a notched lever that is typically located on the steering wheel column.

Typically, a VWTA is designed to only be set in a driver-selected vehicle driving position. In some vehicles such as high performance vehicles, the VWTA also includes a driver-exit configuration that places the steering wheel in a substantially 90-degree displacement from the steering wheel column. In this position the driver can easily exit from the vehicle but the vehicle cannot be safely driven.

The problem with the prior art VWTA is that there is no way to lock the steering wheel in the driver-exit configuration. Therefore, any unauthorized person can release the steering wheel from the driver-exit configuration and place it in the driving configuration allowing the vehicle to be safely driven.

The instant invention solves the above-described problem by producing a lockable vehicle steering-wheel tilting assembly that includes means for locking the vehicle steering wheel in the driver-exit configuration. Thus, an unauthorized person is prevented from releasing the steering wheel from the driver-exit configuration in which position the vehicle cannot be driven.

A search of the prior art and industry literature did not disclose a lockable vehicle steering-wheel assembly that read on the claims of the instant invention. However, the following U.S. patents are considered related:

| U.S. Pat. No. | INVENTOR | ISSUED |
| --- | --- | --- |
| 6,802,193 | Long | Oct. 12, 2004 |
| 2002/0124681 | Hobaugh, II | Sep. 12, 2002 |
| 5,941,131 | Fohi | Aug. 12, 1999 |

The 6,802,193 patent discloses a removable steering wheel device for permitting removal of a steering wheel to make the a vehicle undriveable. The device includes a steering wheel having a boss engageable with an upper end of a steering column of the vehicle. The boss includes a bore and a base wall at the bottom of the bore. A bayonet connection assembly removably connects the boss to the upper end of the steering column. A locking cap disposed within the bore fixes the bayonet connection between the boss and the upper end. The locking cap prevents rotation of the boss relative to the upper end. The 2002/0124681 patent discloses an apparatus that includes a steering shaft rotatable to turn steerable vehicle wheels. A steering wheel has a hub that is connected to an axial end of the steering shaft. A collet has a radially tapered outer surface that is engageable with a tapered surface on the hub and with the axial end of the steering shaft. A fastener connects the steering wheel to the steering shaft. The fastener applies force to the collet to force the radially tapered outer surface of the collet into engagement with the tapered surface defining the opening in the hub.

The 5,941,131 patent discloses a device for attaching a steering wheel on a steering shaft by a connecting sleeve, which is attached to the hub of the steering wheel. The steering shaft has a section with exterior splines, which are complementary to interior splines in the connecting sleeve. The connecting sleeve also has an axial slot that is clamped by a clamping screw against the section of the splined steering shaft.

DISCLOSURE OF THE INVENTION

The improved lockable vehicle steering-wheel tilting assembly (LVWTA) is designed to prevent an unauthorized person from driving a vehicle. The LVWTA adds to the utility of a non-locking vehicle steering wheel tilting assembly by modifying the non-locking assembly and adding a removable locking insert that prevents the steering wheel from being placed in a safe driving position. In its basic design configuration the LVWTA is comprised of:

An inward structure having an attachment plate that is dimensioned to be attached to a vehicle steering column.

An outward structure having an attachment plate that is dimensioned to be attached to a vehicle steering wheel. The outward structure is pivotally attached to the inward structure.

Means for pivoting and placing the outward structure in a substantially vertical-parallel alignment with the inward structure which places the LVWTA in a driving configuration.

Means for pivoting and displacing the outward structure from the inward structure by a substantially 90-degree rotation, which places the LVWTA in a driver-exit configuration. The pivoting means is accomplished by a manually-actuated pivot control rod that is pivotally attached to the outward structure.

The improvement to the non-locking vehicle steering wheel tilting assembly comprises:

The removable locking insert is configured to interface with the inward structure when the outward structure is displaced from the inward structure.

Means for attaching the locking insert to the inward structure.

Means for securing the locking insert.

The means for attaching the locking insert to the inward protrusion comprises the locking insert having a pair of locking protrusion slots. The slots are located and dimensioned to fit over a respective pair of locking protrusions that are located on the inward structure.

The means for securing the locking insert comprises a cylindrical key lock that is inserted into a lock cavity located on the locking insert. The lock includes a locking rod that is positioned by means of a key. When the locking rod is extended and inserted into a pin cavity located on the inward structure, the locking insert cannot be removed from the inward structure.

In view of the above disclosure, the primary object of the invention is to provide a lockable vehicle steering-wheel tilting assembly that can be locked in a non-drivable configuration. Thereby preventing unauthorized persons from safely driving the vehicle.

In addition to the primary object of the invention, it is also an object of the invention to produce a lockable vehicle steering wheel tilting assembly that:

can be produced to accommodate various types of vehicles,
once installed and adjusted the invention is relatively free from periodic maintenance cycles, cannot be removed by an unauthorized person, and is cost effective from both a manufacturer's and consumer's point of view.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 also shows a vehicle steering column attached to the inward structure via a hub adapter and a steering wheel attached to the outward structure.

FIG. 2 is a side elevational view of the LVWTA positioned in a driving configuration.

FIG. 3 is a side elevational view of the LVWTA positioned in a driver-exit configuration.

FIG. 8 is a bottom plan view of the locking insert showing the structure that interfaces with the inward structure and the relative locations of the protrusion slots.

FIG. 9 is an elevational end-view of the locking insert showing the location of the keylock.

BEST MODE FOR CARRYING OUT THE INVENTION

Figure 1:
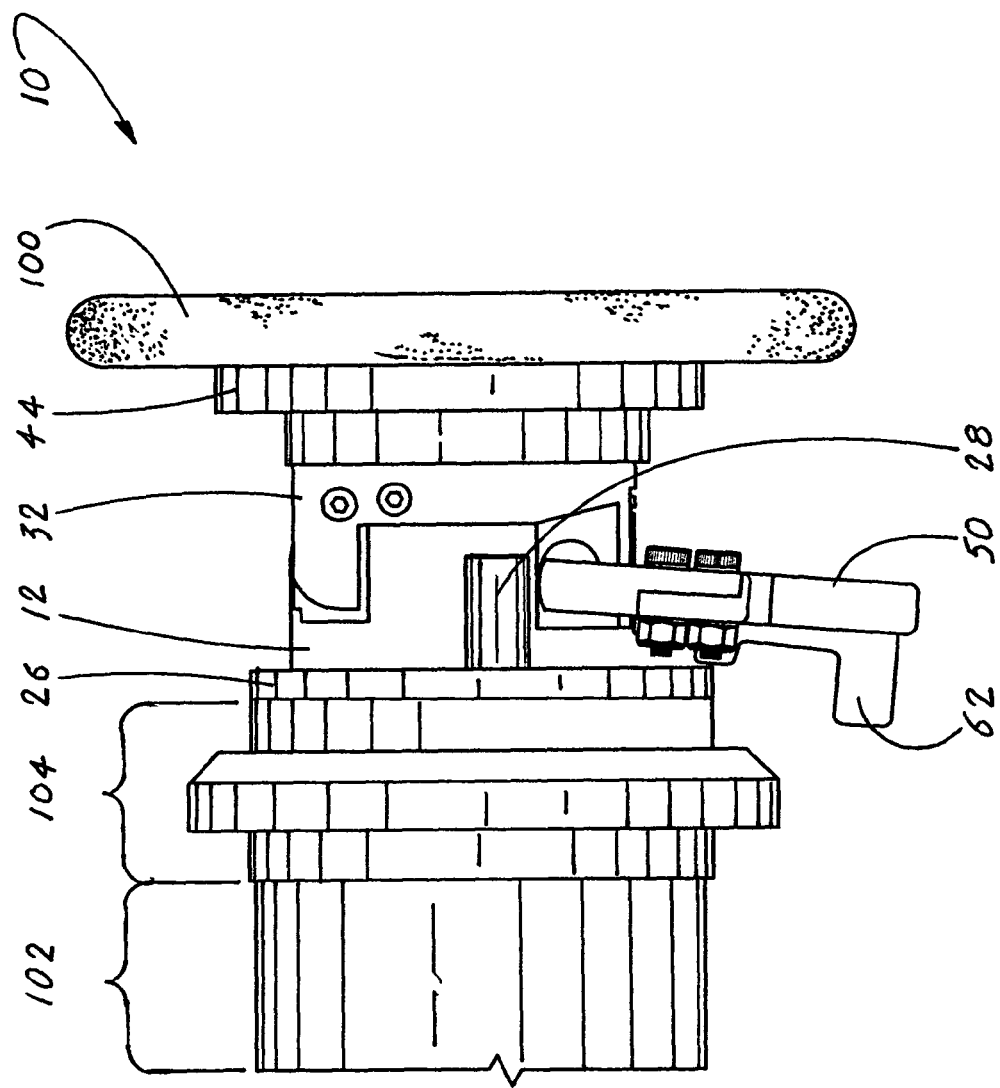
FIG. 1 is a side elevational view of an improved lockable vehicle steering-wheel tilting assembly (LVWTA) showing the relative positions of an inward structure that includes a pair of locking protrusions, an outward structure and a pivot control rod that allows the outer structure to pivot from the inward structure.

The best mode for carrying out the invention is presented in terms of a preferred embodiment for a lockable vehicle steering-wheel tilting assembly that adds structure to improve the utility of a prior art non-lockable vehicle steering-wheel tilting assembly. The lockable vehicle steering-wheel tilting assembly 10 (hereinafter "LVWTA 10"), as shown in FIGS. 1-11, is comprised of the following major elements: an inward structure 12, an outward structure 32, a pivot control rod 50, a removable locking insert 70 and a cylindrical key lock 90. As shown in FIG. 1, the LVWTA 10 is designed to have a vehicle steering wheel 100 attached to an attachment plate 44, that is integrally attached to the outward structure 32. Likewise, as also shown in FIG. 1, a steering column 102 is attached to an attachment plate 26, that is integrally attached to the inward structure 12. As shown in FIG. 1 a short hub 104 is shown attached between the inward structure 12 and the steering column 102. The LVWTA 10 is shown in FIGS. 1, 2 and 3 without the removable locking insert 70, which is described infra and is shown in FIGS. 6-11.

Figure 5:
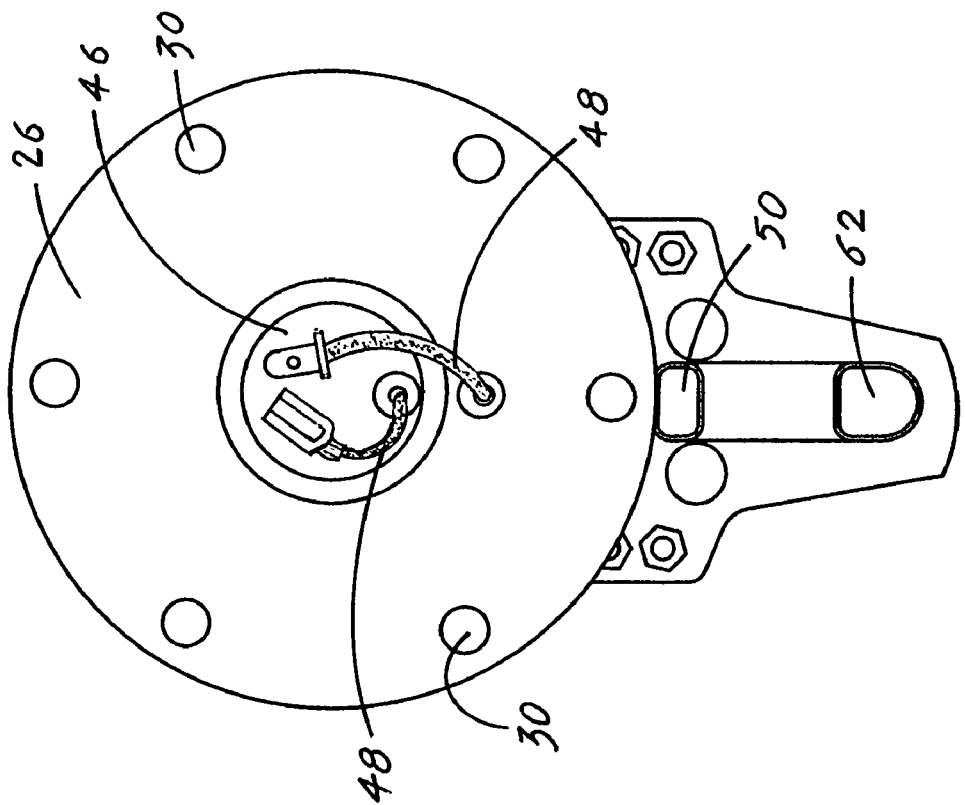
FIG. 5 is a front elevational view of an attachment plate that is comprised of an integral element of the inward structure and that is dimensioned to be attached to a vehicle steering column.

The inward structure 12, as shown best in FIGS. 2 and 3, has an inner surface 14, an outer surface 16 and a cylindrical edge 18 having an upper section 20 and a lower section 22, wherein the lower section 22 includes a pin cavity 24, as best shown in FIG. 3. The outer surface 16 is further comprised of the integral attachment plate 26 which has a plurality of attachment bores 30, as shown in FIG. 5, and that is designed to be attached to the vehicle steering column 102, as shown in FIG. 1.

Figure 4:
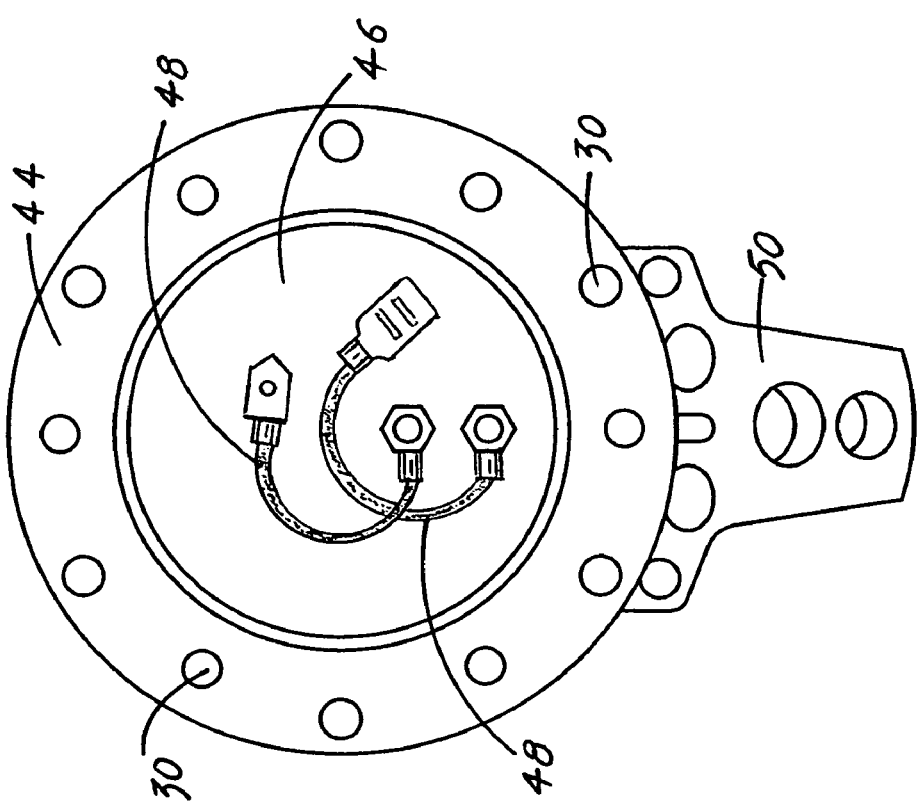
FIG. 4 is a front elevational view of an attachment plate that is comprised of an integral element of the outward structure and that is dimensioned to be attached to a vehicle steering wheel.

The outward structure 32, as also shown in FIGS. 2 and 3, has an inner surface 34, an outer surface 36 and a cylindrical edge 38 having an upper section 40 and a lower section 42. Integrally attached to the inner surface 34 is an attachment plate 44, which has a plurality of attachment bores 30, as shown in FIG. 4, and that is designed to be attached to the vehicle steering wheel 100, as shown in FIG. 1. The upper section 40 of the outer structure 32 is pivotally attached to the upper section 20 of the inward structure 12. Both of the attachment plates 26,44 have a recess 46, as shown in FIGS. 4 and 5, that allows a set of electrical wires 48 to pass through to the vehicle horn which is not shown.

The pivot control rod 50, as best shown in FIGS. 2 and 3, includes an upper end 52 and a lower end 54. A pair of pivot pins 56 pivotally attaches the upper end 52 to the upper section 40 of the outward structure 32. Substantially centered on the rod 50 is located a spring-loaded locking pin 58 that normally projects outward through a pin cavity 60, as shown in FIG. 3. The locking pin 58 can be retracted into the pin cavity 60 by a manually actuated spring-loaded slide 62 that is attached adjacent to the lower end 54 of the pivot control rod 50. The rod 50 can be manually placed in either a forward position, as shown in FIG. 2, or in a rearward position, as shown in FIG. 3. When the rod 50 is placed in the forward position and the locking pin 58 is inserted into the pin cavity 24, the outward structure 32 is in a substantially vertical-parallel alignment with the inward structure 12, which places the LVWTA 10 in a driving configuration, as shown in FIG. 2. Likewise, when the locking pin 58 is extracted from the pin cavity 24 by the spring-loaded slide 62 and the rod 50 is placed in the rearward position, the outward structure 32 is displaced from the inward structure 12 by substantially 90-degrees. This displacement places the LVWTA 10 in a driver-exit configuration, as shown in FIG. 3.

Figures 10, 11:
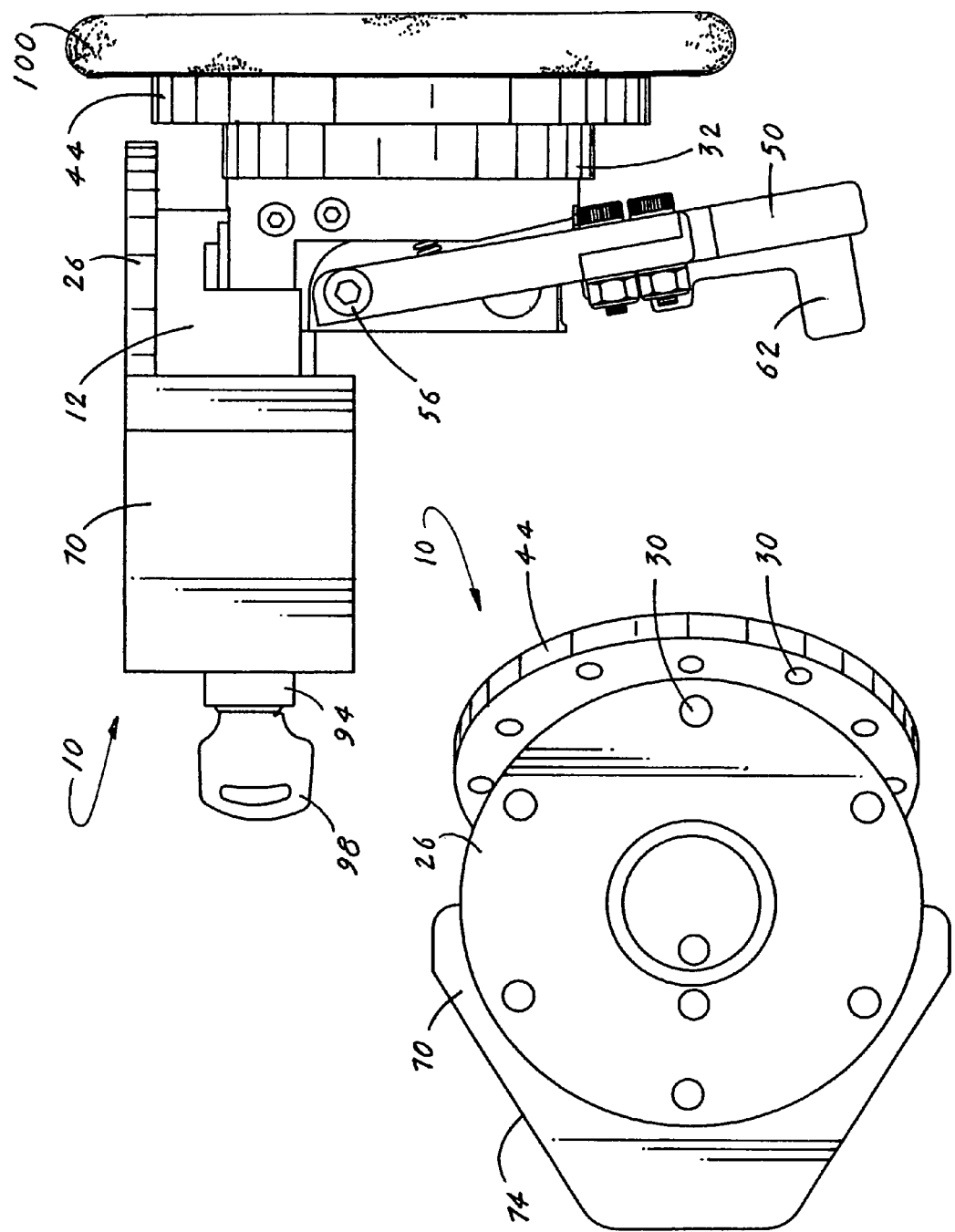
FIG. 10 is a top plan view of the LVWTA showing the locking insert attached to the inner structure.
FIG. 11 is a side elevational view of the LVWTA showing the locking insert attached to the inward structure and with a vehicle steering wheel attached to the attachment plate of the outer structure.

The LVWTA 10 has been improved by making design changes to the inward structure 12 and adding a removable locking insert 70. When the locking insert 70 is attached, the LVWTA 10 is placed in the driver-exit configuration, as shown in FIG. 11. When in the driver-exit configuration the vehicle horn is disabled and the vehicle cannot be safely steered.

The design change to the inward structure 12 consists of adding a pair of locking protrusions 28 to each side of the cylindrical edge 18. The protrusions 28, as shown in FIGS. 2 and 3, extend normal to the plane of the inward structure 12.

The removable locking insert 70, as shown in FIGS. 6-11, includes an upper surface 72, a lower surface 74, an inner surface 76 and an outer surface 78. The inner surface 76 includes a center section 80 that is integrally attached to a pair of outward-extending sections 82, with each section having an outer edge 84. The inner surface 76 and the outward-extending sections 82 are configured to interface with the inner surface 14 of the inward structure 12, when the outward structure 32 is displaced from the inward structure 12, as shown in FIG. 11.

Figure 7:
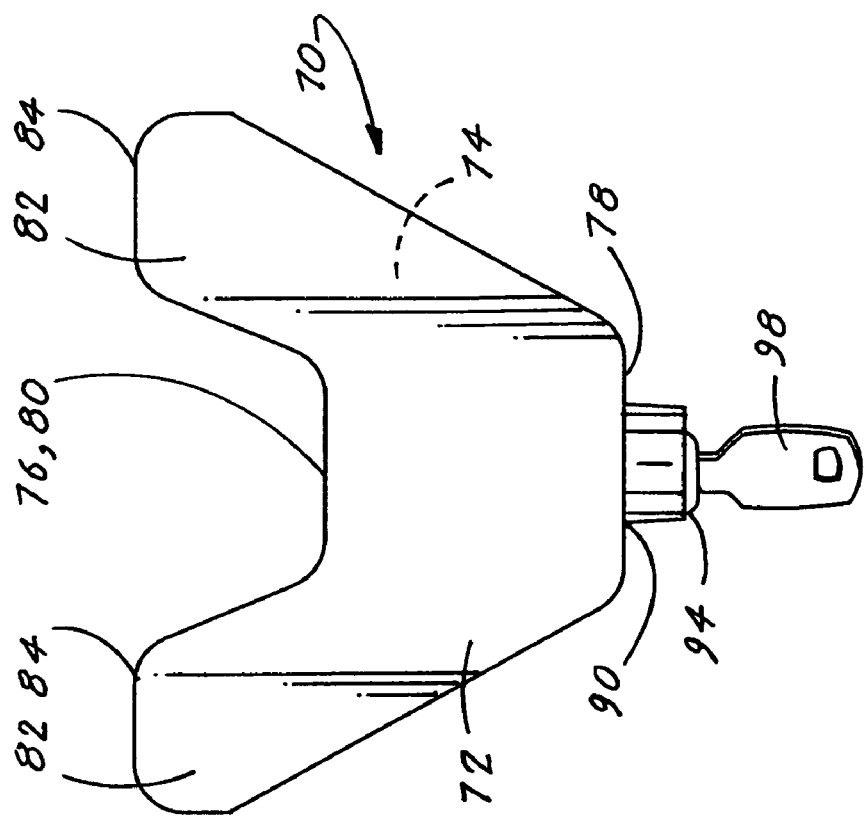
FIG. 7 is a top plan view of a locking insert showing a keylock in an unlocked position.

Located adjacent to the outer edge 84 of each respective outward-extending section 82 is a pair of locking protrusion slots 86, as shown in FIG. 8. The locking protrusion slots 86 are dimensioned to fit over the respective pair of locking protrusions 28, which are located on the inward structure 12, as shown in FIGS. 2 and 3. The locking insert 70 also includes a lock cavity 90, as shown in FIGS. 7 and 9, that extends from the inner surface 76 and that terminates with a locking rod bore 92. The bore 92 extends through the center section 80 of the inner surface 76, as shown in FIG. 8.

The final element that comprises the improvement to the LVWTA 10 is a cylindrical key lock 94 having a locking rod 96, as shown in FIG. 8, whose locked or unlocked position is controlled by a lock key 98. The cylindrical key lock 94 is dimensioned to be inserted into the lock cavity 90 and is attached thereto by a lock attachment means.

Figure 6:
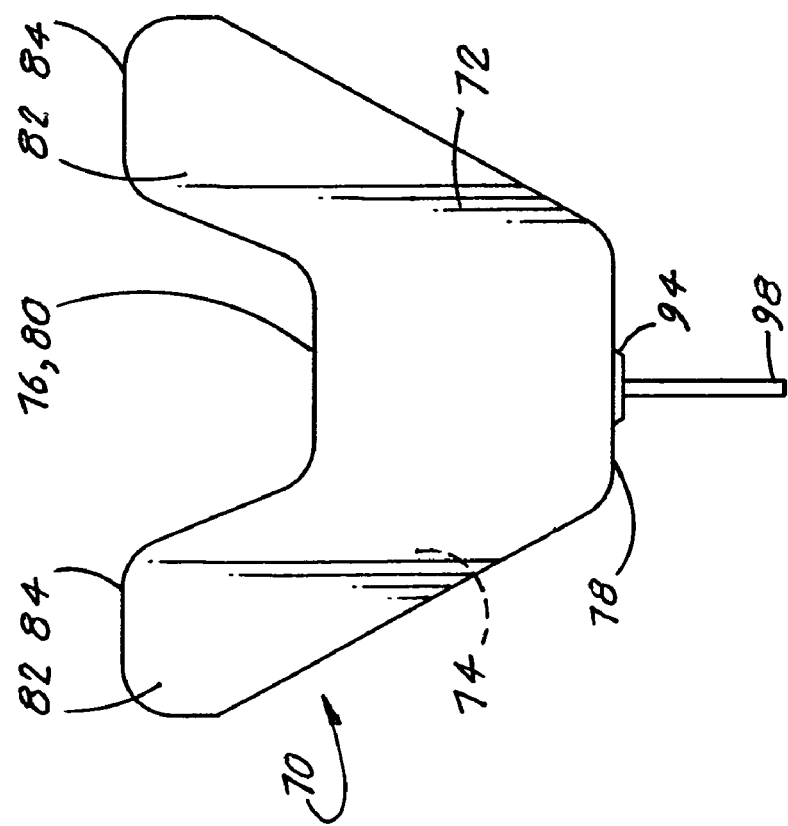
FIG. 6 is a top plan view of a locking insert showing a keylock in a locked position.

When the cylindrical key lock 94 is unlocked, as shown in FIG. 7, the locking rod 96 is retracted into the locking rod bore 92. Conversely, when the cylindrical key lock 94 is locked, as shown in FIGS. 6 and 8, the locking rod 96 extends beyond the inner surface 76 of the locking insert 70 and is inserted into the pin cavity 24 located on the inward structure 12, as shown in FIG. 3. When the LVWTA 10 is placed in the driver-exit configuration, as shown in FIGS. 3, 10 and 11, there is sufficient space to insert the pair of locking protrusion slots 86 located on the locking insert 70 over the pair of locking protrusions 28 located on the inward structure 12.

When the cylindrical key lock 94 is placed in the locked position, as shown in FIG. 6, the locking insert is secured thereby preventing the outward structure 32 from pivoting downward into the driving configuration, thereby preventing the vehicle from being safely steered.

While the invention has been described in detail and pictorially shown in the accompanying drawings it is not to be limited to such details, since many changes and modifications may be made to the invention without departing from the spirit and the scope thereof. For example, the inward structure 12, the outward structure 32 and the locking insert 70 can be made of a metal that is selected from the group consisting of aluminum, brass and steel. Additionally, when aluminum is utilized it can be anodized in a selectable color. Hence, it is described to cover any and all modifications and forms which may come within the language and scope of the claims.

The invention claimed is:

1. An improved lockable vehicle steering-wheel tilting assembly that functions in combination with a non-locking vehicle steering wheel tilting assembly comprising:
   a) an inward structure having an attachment plate to which is attached a vehicle steering column,
   b) an outward structure having an attachment plate to which is attached a vehicle steering wheel, wherein the outward structure is pivotally attached to the inward structure,
   c) means for pivoting and placing the outward structure in a substantially vertical-parallel alignment with the inward structure, which places the assembly in a driving configuration,
   d) means for pivoting and displacing the outward structure from the inward structure by a substantially 90-degree rotation which places the assembly in a driver-exit configuration, wherein the improvement to the non-locking vehicle steering wheel tilting assembly comprises:
      (1) a removable locking insert that is configured to interface with the inward structure when the outward structure is displaced from the inward structure,
      (2) means for attaching the locking insert to the inward structure, and
      (3) means for securing the locking insert, wherein the locking insert prevents the outward structure from pivoting downward into the driving configuration, thereby preventing the vehicle from being safely steered.

2. The improved lockable vehicle steering wheel tilting assembly as specified in claim 1, wherein the inward structure, the outward structure and the locking insert are made of a metal that is selected from the group consisting of aluminum, brass and steel.

3. The improved lockable vehicle steering wheel tilting assembly as specified in claim 2, wherein the aluminum can be anodized in a selectable color.

4. The improved lockable vehicle steering wheel tilting assembly as specified in claim 1, wherein the attachment plate that is attached to the vehicle steering column further having a plurality of attachment bores that range from 4 to 8 bores.

5. The improved lockable vehicle steering-wheel tilting assembly as specified in claim 1, wherein the attachment plate that is attached to the vehicle steering wheel further having a plurality of attachment bores that range from 8 to 14 bores.

6. The improved lockable vehicle steering-wheel tilting assembly as specified in claim 1, wherein said means for pivoting and displacing the outward structure comprises a pivot control rod that is pivotally attached to the outward structure.

7. The improved lockable vehicle steering-wheel tilting assembly as specified in claim 1, wherein said means for attaching the locking insert to the inward structure comprises:
   a) said inward structure having a pair of locking protrusions, and
   b) said locking insert having a pair of locking protrusion slots that are located and dimensioned to fit over the respective pair of the locking protrusions.

8. The improved lockable vehicle steering-wheel tilting assembly as specified in claim 6, wherein the pivot control rod includes a manually retracted locking pin that is inserted into a pin cavity located on the inward structure, wherein when the pin is inserted the outward structure is locked in the driving configuration.

9. The improved lockable vehicle steering-wheel tilting assembly as specified in claim 1, wherein said means for securing the locking insert comprises a cylindrical key lock that is inserted into a lock cavity located on said locking insert, wherein said lock having a locking rod that is positioned by means of a key, wherein when the locking rod is extended and inserted into a pin cavity located on the inward structure, the locking insert cannot be removed from the inward structure.

10. An improved lockable vehicle steering-wheel tilting assembly that functions in combination with a non-locking vehicle steering-wheel tilting assembly comprising:
   a) an inward structure having an inner surface, an outer surface and a cylindrical edge having an upper section and a lower section having a pin cavity, wherein the outer surface is comprised of an integral attachment plate having a plurality of attachment bores and that is designed to be attached to a vehicle steering column,
   b) an outward structure having an inner surface, an outer surface and a cylindrical edge having an upper section and a lower section, wherein the outer surface is comprised of an integral attachment plate having a plurality of attachment bores and that is designed to be attached to a vehicle steering wheel, wherein the upper section is pivotally attached to the upper section of the inward structure, c) a pivot control rod having an upper end and a lower end, wherein the upper end is pivotally attached by a pair of pivot pins to the upper section of the outward structure, wherein adjacent to the lower end of the rod is located a locking pin that normally projects outward through a pin cavity, wherein the locking pin can be retracted into the pin cavity by a manually actuated spring-loaded slide that is attached adjacent to the lower end of the pivot control rod, wherein the rod can be manually placed in either a forward position or in a rearward position, wherein when the rod is placed in the forward position and the locking pin is inserted into the pin cavity, the outward structure is in a substantially vertical-parallel alignment with the inward structure, which places the assembly in a driving configuration, likewise when the locking pin is extracted from the pin cavity by the spring-loaded slide and the rod is placed in the rearward position, the outward structure is displaced from the inward structure by substantially 90-degrees, which places the assembly in a driver-exit configuration, wherein the improvement to the non-locking vehicle steering-wheel tilting assembly comprises:

(1) said inward structure further having on each side of the cylindrical edge a pair of locking protrusions that extend normal to the plane of the inward structure, (2) a removable locking insert having:

(a) an upper surface, a lower surface, an inner surface and an outer surface, wherein the inner surface includes a center section that is integrally attached to a pair of outward-extending sections with each section having an outer edge, wherein the inner surface and the outward-extending sections are configured to interface with the inner surface of the inward structure when the outward structure is displaced from the inward structure, (b) a pair of locking protrusion slots that are located adjacent to the outer edge of each respective outward extending section, wherein the locking protrusion slots are dimensioned to fit over the respective pair of the locking protrusions that are located on the inward structure, (c) a lock cavity that extends from the outer surface and that terminates with a locking rod bore that extends through the center section of the inner surface, (d) a cylindrical key lock having a locking rod whose locked or unlocked position is controlled by a lock key, wherein the cylindrical key lock is dimensioned to be inserted into the lock cavity and is attached thereto by a lock attachment means, wherein when the cylindrical key lock is unlocked, the locking rod is retracted, conversely when the cylindrical key lock is locked, the locking rod extends beyond the inner surface of the locking insert and is inserted into the pin cavity located on the inward structure, wherein when said assembly is placed in the driver-exit configuration there is sufficient space to insert the pair of locking slots located on said locking insert over the pair of locking protrusions located on the inward structure, wherein when the cylindrical key lock is locked, the locking insert is secured which prevents the outward structure from pivoting downward into the driving configuration, thereby preventing the vehicle from being safely steered.

11. The improved lockable vehicle steering-wheel tilting assembly as specified in claim 10, wherein the inward structure, the outward structure and the locking insert are made of a metal that is selected from the group consisting of aluminum, brass and steel.

12. The improved lockable vehicle steering-wheel tilting assembly as specified in claim 11, wherein the aluminum is anodized in a selectable color.

13. The improved lockable vehicle steering-wheel tilting assembly as specified in claim 10, wherein the attachment plate that is attached to the vehicle steering column further having a set of mounting bores that range from 4 to 8 bores.

14. The improved lockable vehicle steering-wheel tilting assembly as specified in claim 10, wherein the attachment plate that is attached to the vehicle steering wheel further having a set of mounting bores that range from 8 to 14 bores.

15. The improved lockable vehicle steering-wheel tilting assembly as specified in claim 10, wherein each of the mounting plates having a recess that allows a set of electrical wires to pass through.

* * * * *